United States Patent Office 3,788,823
Patented Jan. 29, 1974

3,788,823
BRAZED FOAMED METAL
Ronald L. Wells, Laramie, Wyo., assignor to Ethyl Corporation, New York, N.Y.
No Drawing. Filed Apr. 21, 1971, Ser. No. 136,235
Int. Cl. B32b 15/00
U.S. Cl. 29—197
1 Claim

ABSTRACT OF THE DISCLOSURE

Composite articles are prepared utilizing brazing to apply a metal body to a foamed metal substrate. Preferably, the substrate is a foamed aluminum, and the applied metal body is an aluminum sheet. Brazing substances which are liquid below the melting point of the sheet are employed. The brazing substance is applied in a manner to wet the treated surface. One way wetting can be accomplished is by rubbing the surface while it has been treated with molten brazing substance.

BACKGROUND OF THE INVENTION

Foamed metals have been described in the prior art; see for example, U.S. Ser. Nos. 2,895,819, 3,300,296, and 3,297,431. Such foams are produced by adding a gas-evolving compound to a molten metal, and heating the resulting mixture to decompose the gas-forming compound to prepare blowing gas. The gas causes the metal to foam, and after foaming the resultant mass is cooled to form a set cellular product. The gas-forming solid may be a metal hydride such as $ZrH_2$ or $TiH_2$; U.S. Ser. No. 2,983,597.

Treatment of foamed metals with various plastic coatings is described in application, Ser. No. 774,756 filed Nov. 12, 1968, by C. P. Jarema et al. Various composite articles are also described in application, Ser. No. 866,754 filed Oct. 15, 1969, by M. E. Kucsma. The applications cited have an assignee common with the instant application.

SUMMARY OF THE INVENTION

This invention is directed to composite articles comprising a foamed metal substrate having a metal body bonded thereto by a bonding layer of metallic brazing substance; and methods for forming such articles.

This invention pertains to an article of manufacture which is a foamed metal substrate having a surface overlaid with a metal body, said substrate and said body being bonded by a bonding layer of metallic brazing substance, said metallic brazing substance having been applied in a molten state to a surface to be bonded, in a manner such that said surface to be bonded is wetted by said brazing substance.

This invention also pertains to a process for preparing an article that is a foamed metal substrate overlaid with a metal body; said process comprising applying a molten brazing substance to a surface to be bonded in a manner such that said surface is wetted by said substance; while said substance is molten contacting said substrate and said body along said surface to be bonded; and subsequently allowing said substance to solidify, thereby forming said article.

DESCRIPTION OF PREFERRED EMBODIMENTS

This invention is applicable to forming composite articles from foamed aluminum. The aluminum may be pure, substantially pure or an aluminum alloy. Preferable alloys contain at least about 65 percent aluminum. Thus, besides aluminum, other applicable aluminum based materials contain up to 35 percent of one or more alloying elements. More preferably, such alloys contain, besides aluminum, a second metal selected from magnesium, titanium, copper, zinc, manganese, tin and silicon. With regard to these alloying elements, the following table indicates the preferred and most preferred concentrations ranges:

TABLE I

| Metal | Preferred, percent | Most preferred, percent |
|---|---|---|
| Magnesium | 2–10 | 4–8 |
| Titanium | 0.5–2.5 | 0.8–1.2 |
| Copper | 2.5–35 | 8–12 |
| Zinc | 3–15 | 8–12 |
| Manganese | 0.4–1.5 | 0.4–0.8 |
| Tin | 0.4–2 | 1–2 |
| Silicon | 0.4–12 | 0.4–2 |

For the purposes of this invention, "substantially pure aluminum" refers to aluminum having a purity of at least 98.5 (weight) percent, and "aluminum base metal" refers to such aluminum and aluminum alloys wherein the aluminum content is at least about 65 (weight) percent.

The following alloys yield foams suitable for this invention when used in a process employing a titanium or zirconium hydride as a blowing agent. Suitable techniques are the processes of the prior art set forth in the patents cited herein in the section "Background of the Invention." Moreover, said alloys yield suitable foams when the molten alloy is made more viscous by a suitable viscosity-increasing agent.

Alloy:
- 7075 — 1.6 percent Cu, 2.5 percent Mg, 0.3 percent Cr, 5.6 percent Zn, remainder Al.
- 2024 — 4.5 percent Cu, 0.6 percent Mn, 1.5 percent Mg, remainder Al.
- 5086 — 0.45 percent Mn, 4.0 percent Mg, 0.1 percent Cr, remainder Al.
- 6063 — 0.4 percent Si, 0.7 percent Mg, remainder Al.
- Almag 35 — 6–8 percent Mg, in Al.
- 1000 series Al — 99.6 percent minimum Al.
- 2011 — 5.5 percent Cu, 0.5 percent Pb, 0.5 percent Ni, remainder Al.
- 2218 — 4.0 percent Cu, 1.5 percent Mg, 2 percent Ni, remainder Al.
- 3005 — 1.2 percent Mn, 0.4 percent Mg, remainder Al.
- 4042 — 12.2 percent Si, 0.9 percent Cu, 1.1 percent Mg, 0.9 percent Ni, remainder Al.
- 4043 — 5 percent Si, 95 percent Al.
- 8280 — 1.5 percent Si, 1.0 percent Cu, 0.5 percent Ni, remainder Al.
- Magnallium — 70 percent Al, 30 percent Mg.

From the utility of this invention in forming composite articles of foamed aluminum one may deduce that foams of other metals can be also employed. Thus, the techniques of this invention may be applied in overlaying foams of lead, zinc, magnesium, nickel, copper, iron, and the like. With these metals as with aluminum one would preferably employ a brazing substance which is liquid at a temperature which will not cause undue deformation of foam structure.

The metallic body which is attached to the foam substrate can be selected from the aforementioned metals and a wide variety of others such as chromium, manganese, titanium, zirconium, etc. In many instances, stronger bonds are formed when the foam and body are made from the same or similar metals. Thus, for example, many preferred articles of this invention have aluminum-containing bodies brazed to foams of aluminum or aluminum-containing metals. However, especially where it is desirable to derive benefits from two or more metals, some composite articles are also preferred embodiments of this invention. For example, foamed aluminum with one or more sheets of steel brazed thereon is particularly suited where aluminum's lightness is to be combined with the strength or other desirable properties of steel.

Furthermore, such articles as foamed aluminum with aluminum sheet on one side and steel sheet on another are within the scope of this invention. Such articles may have the sheets on opposing sides (sandwiches) or the brazed sides may have some other relationship.

When two or more metal bodies are melded to a foamed substrate, the brazing substance for each body may be alike or different. Sometimes it is efficacious to use different brazing materials when the ability to bond varies among the metal bodies attached to the foam.

The shape of the metal body brazed to the metal foam is not critical. It can be another piece of foam, identical, alike, or different in composition. It can be a thick piece of metal or a sheet. In many applications, sheets are preferred. There is no upper limit to the thickness of the sheet; usually it is preferred that the sheet be at least 10 mils in thickness.

The surface configuration of the metal body is not critical, although it is usually desirable to have sufficient contact with the foam to yield a bond of some strength. Preferably, the configuration of the metal body has a surface to be bonded to the foam which corresponds more or less closely in shape to the foam surface to be bonded. The bonding surfaces may be irregular or contoured, but for many applications it is desirable to bond a substantially flat metal body surface to a substantially flat surface of foamed metal. For many applications it is desired that the foamed body be at least about one-quarter (¼) inch in thickness.

Before brazing, it is usually desirable to treat the surface by precleaning. The precleaning practice will vary depending on the condition of the metal surface, the thickness of the material, and the composition of the substances. In many instances, a degreasing solvent can be used; carbon tetrachloride is a non-limiting example. In many instances, it is desirable to follow degreasing with a caustic or acid treatment. A typical caustic treatment is treating with 5 percent NaOH at 140° F. up to 60 seconds and then rinsing in cold water. Typical acids suitable for precleaning are $HNO_3$ and HF either alone or in mixture, or by using one acid followed by the other. Acid treatment up to 5 minutes is common, as is a following rinse in hot or cold water. Dilute acids are commonly employed. An acid rinse found useful when bonding aluminum sheet to aluminum foam was

|  | Parts |
|---|---|
| $HNO_3$ | 8 |
| HF | 1½ |
| $H_2O$ | 13 |

Caustic or acid treatment can be used without prior degreasing if so desired.

In some instances, it is desirable to pretreat the metal body or foam by wire brushing or similar technique. In some cases this can be conducted in lieu of degreasing.

Fluxes can be employed in this invention. Some fluxes useful for aluminum are mixures of chloride and fluoride salts and they are compounded to have appropriate melting ranges and be sufficiently active at brazing temperature. Flux aids in removal of oxide coating so that molten filler can wet the base metal. As known, for torch or furnace brazing, a paste of flux powder in water or alcohol can be brushed or otherwise applied to the area to be brazed.

Various brazing techniques can be employed in this invention so long as the nature of the foamed substrate and its behavior on heating are borne in mind. Good results can be achieved with furnace or torch brazing for example; torch brazing is preferred. A brief description of various brazing techniques is given in McGraw-Hill, Encyclopedia of Science and Technology, (1966), vol. 2, pp. 322–323. A more detailed work is Brazing Manual, Reinhold Pub. Corp. New York, N.Y. (1955). The description of brazing techniques therein, including torch and furnace brazing are incorporated by reference herein as if fully set forth. The encyclopedic reference, supra, summarizes in tabular form flux and atmospheres utilizable in brazing various materials. With regard to atmosphere, in many instances ambient atmosphere can be used. Also, a nitrogen or inert gas atmosphere or the atmosphere generated by a neutral or reducing flame can be employed. A suitable atmosphere is easily achieved when torch brazing according to my invention since I prefer to use a non-oxidizing flame. A vacuum or partial vacuum can also be used.

For the results achieved by this invention, it is important for a surface of the metal body, or a surface of foamed substrate, or both surfaces, to be wetted by the metallic brazing substance. I have enhanced wetting of the materials to be bonded during torch brazing by rubbing a stick or rod of the metallic brazing substance onto the surface to be bonded while said surface has molten metallic brazing substance thereon. When performing this operation I maintain the torch position so the flame does not melt the stick or rod directly. The rubbing can be done with a back-and-forth motion; this appears to enhance results in some instances.

Another technique which may be employed is to overlay the surface to be bonded with molten brazing metal substance, and while maintaining the substance molten, rubbing the surface with a device such as a solder brush. The applicability of this technique suggests utilization of a brush in which a plurality or all of the bristles are made of the brazing metal. As with a stick, rod, or sheet, a brush can be applied in a back-and-forth motion through the layer of molten brazing metal on the surface to be bonded.

Thus, for this invention, one can treat a surface to be brazed by subjecting it to pressure, the pressure to be applied in a manner such that there is not only a vertical component but also a component along the surface. This may be achieved by subjecting the surface to pressure by application of a solid object to the surface and while the object and surface are touching, moving the object along the surface. Thus, the surface to be brazed is subjected to the action of something moving over the surface with some pressure and friction. This motion or rubbing may be in one or more directions and in a straight line or curved. The rubbing may be applied by vibratory or oscillating or back-and-forth motion. The rubbing motion is applied to a surface having a molten brazing substance thereon.

The mechanism of rubbing is not known. It can be speculated that it assists in removal of oxide and other impurities from the metal surface allowing more metal-to-metal bonding to occur. However, I do not wish to be bound by any particular mechanism. Whatever the mechanism, such action results in an apparent increase in wetting, noted upon visual inspection. It has been noted visually that rubbing results in a more clinging contact of the molten brazing substance with the treated surface and a lessened tendency of the molten material to run off or puddle. The terms "wetting" or "wetted" are used throughout this application in referring to this apparent wetting increase achieved by rubbing.

When treating a surface to achieve the wetting discussed above, the pressure applied while rubbing can be somewhat high, since rubbing action can be applied such that rubbing will not result in an undesirable degradation of the metal body. However, it is not necessary for high pressures to be employed, light pressures will work in many instances. Light pressures are preferably used when treating a surface of the foamed substrate since higher pressures can result in an undesired deformation of the foam. The pressure to be employed is generally within the range of from about 1 to about 1000 p.s.i. and especially when treating the foam usually within the range of from about 1 to about 100 p.s.i. Higher and lower pressures can be used. In many instances, low pressures applied for a longer period will achieve results similar to rubbing harder for a shorter period.

The metallic brazing substance has a liquidus temperature lower than the melting point of the surface to be treated. In many instances, it is desirable to treat both surfaces to be bonded (viz, a foam surface and a surface of the metal body) with the brazing substance. In such instances the brazing substance must be workable at a temperature lower than the lower workable temperature of the foam or other surface. In general, it is desirable to use a brazing substance having an appreciable amount of liquid phase at a temperature 100° F. or farther below the melting temperature of the items to be joined by brazing. However, if careful control is used, brazing metals which melt 10° or 20° F. below the melting point of the surface to be treated can be employed.

When treating the metal foam, care is employed to avoid undue deformation of the foam by action of heat or pressure when applying the brazing substance; some surface deformation is acceptable, however. Molten brazing substance usually seeps into pits present on the surface being treated. If these pits communicate with cells within the body of the foam, further seepage into the foamed body can occur. In many instances, seepage into the foam surface results in a stronger bond and is therefore beneficial.

When torch brazing, the part can be brought to working temperature with the torch or, as desired, can be brought at or near temperature by other means, say, by a furnace. Also, it is to be understood that a foam can be composited with another metal body without brazing the entire area to be abutted. In many instances it is desirable to braze only the surface at the periphery or a portion of the periphery of the abutting sides. Also, a separate flux need not be employed, especially in those instances where the metallic brazing substance is self fluxing.

Various shapes of rings, round wire, sheets, and straight sections of metal brazing substance can be preplaced when desired. These shapes are chosen to adapt to the geometry of the part to be brazed. Customary afterbraze cleaning procedures can be used as desired.

As indicated above, aluminum base metals are among the substances which can be brazed by this invention. Typical aluminum-containing materials which can be treated according to this invention include aluminum 1100, 3003, 5052, 6061, 6063, 6951, 7075 and the like. Analyses for such materials appear on page 19 of Standards for Aluminum Mill Products, 1967, The Aluminum Association, 9th ed. November 1966.

To an appreciable extent, the selection of the metallic brazing substance is made on the basis of the temperature requirements discussed above. To some extent, as noted above, one wishes to use in many instances a brazing metal related to or the same as a metal within the articles to be abutted since bonding between the same or related metals generally results in greater bond strength.

The metallic brazing substance may be an alloy. Suitable alloys may be binary, ternary, or quaternary, for example. Such combinations of zinc, magnesium, tin, silicon, copper and aluminum are useful in this invention. Thus, exemplary suitable binary alloys are aluminum-magnesium and aluminum-silicon. Typically, I can employ alloys containing from about 10 to about 90 weight percent aluminum and from about 90 to about 10 weight percent magnesium. Thus, I can use the low melting eutectic of 32 percent Al and 68 percent magnesium, or combinations with 50–90 percent aluminum. Other typical binary alloys which exemplify applicable alloys are Al-Cu, Cu-Al, Cu-Sn, Cu-Zn, and the like.

Ternary systems applicable for this invention include combinations of the above named metals exemplified by aluminum-magnesium and silicon. Thus, I can use an alloy with about 3 to about 15 percent silicon and 0.4–10 percent magnesium, the balance being aluminum. Other ternary systems which I can use are Al-Cu-Mg, Al-Zn-Mg and the like. Quaternary mixtures include combinations of the above named metals. Typical alloys of this type are Al-Mg-Cu-Zn such as Al 78.5 percent, Mg 5 percent, Cu 5 percent, and 11.5 weight percent zinc.

For typical brazing substances applicable in this invention, reference is made to U.S. Pat. Nos. 3,321,828, 3,322,517, 3,235,959, 3,415,697, and 3,356,494.

For aluminum, good results have been achieved using EutecRod 19, a self-fluxing alloy containing zinc, aluminum and copper. One sample analyzed Zn, 92 percent; Al, 2.82 percent; Cu, 2.17 percent. This welding alloy is available from the Eutectic Corporation, 40–40 172nd St. Flushing, N.Y. 11358. Other useful alloys are:

Alloy A: 93 percent Zn, 3 percent Al, 4 percent Mg
Alloy B: 35 percent Zn, 50 percent Mg, 15 percent Al
Alloy C: 64 percent Al, 26 percent Mg, 10 percent Cu In these examples, percent is by weight. Other similar metallic brazing substances can also be employed.

The following are preferred embodiments of this invention.

(A) An article of manufacture comprising a foamed aluminum substrate having a surface overlaid with an aluminum sheet, the foamed aluminum and aluminum sheet being bonded together by a bonding layer of metallic brazing substance, said metallic brazing substance having been applied in a molten state to a surface of the sheet and a surface of the foam in a manner such that those surfaces to be bonded were wetted by the molten metallic brazing substance. A typical metal sheet is made from 5052 aluminum.

(B) An article of the type described above, wherein the foamed aluminum is prepared from an aluminum alloy containing from about 6 to 8 weight percent magnesium.

(C) An article of Item B, wherein the foamed aluminum has a density of from about 8 to about 35 pounds per cubic foot.

(D) An article of the type described in C above, wherein the foam has an average pore size of from about 1/32 to about 1/8 of an inch.

(E) An article of Item D, wherein the surface of foamed aluminum to be bonded is pitted by cavities formed from cells having an average diameter of 1/32–1/8 of an inch.

(F) An article of Item E, wherein the molten metallic brazing substance has been applied to the pitted surface utilizing a back-and-forth rubbing motion.

(G) An article of Item F, wherein the metallic brazing substance is an alloy having an appreciably liquid phase at a temperature below the melting temperature of the aluminum foam.

The following is a technique which has been applied in torch brazing using aluminum foam and aluminum sheet:

(1) Wire brush the aluminum sheet.
(2) Heat the sheet and foam separately, but simultaneously, until wetting of the surfaces is obtained with a rod of a metallic brazing substance. The rod should be rubbed into the hot metal and the torch flamed should not melt the rod directly.
(3) Spread a thin layer of the brazing alloy over both surfaces, keeping both layers of the brazing alloy molten.
(4) Bring the foam into contact with the sheet, abutting the brazed surface, and press together until cooled below the melting point of the metallic brazing substance.
(5) If it is desired to form a sandwich, repeat Steps 1–4 utilizing the other side of the foam or sheet as desired.

The above general process has been applied using

EutecRod 19 and can be utilized in preparing composite articles of the preferred types set forth in Items A–G above.

The following additional example is illustrative but non-limiting.

A piece of aluminum foam ¾" x 2½" x 12" and having a density of 17 p.c.f. was heated to 650° F. in an oven for two hours. The heated foam was then placed on an insulating brick. An oxyacetylene torch flame was played over the foam surface repeatedly until the foam was sufficiently hot to melt the brazing alloy, EutecRod 19. Ultimately the entire surface was covered with molten brazing alloy. The brazing alloy was skimmed and the treated surface brushed with a flux brush. (No separate flux was used.)

The procedure was repeated on a sheet 32 mil. metal 6061 T–6. The treated surfaces were mated and the torch played on the face sheet surface to melt the filler metal which had solidified. After both surfaces appeared to be molten, the surfaces were pressed with a 5 pound weight, which covered the entire panel being brazed. The procedure was repeated on the opposite side of the foam to form a sandwich structure in which foam was between two metal sheets.

A better bond was achieved when the above procedure was repeated except that the surface of the foam was brushed and the face sheet abraded before application of the molten brazing substance, EutecRod 19.

The above procedure was also repeated except the foam and face sheets were abraded with emery paper prior to applying the brazing alloy. The bond was not as satisfactory as that obtained when the foam was wire-brushed.

Better results were achieved when the foam was not preheated in the furnace prior to torch brazing. Also, the foam and face sheets were quickly pressed together before the brazing alloy had solidified. Instead of the 5 pound weight, an insulating brick was used to press the mated surfaces together.

The procedure can be employed to prepare foam composites of the type described by Items A–G above.

In addition, the technique can be utilized with magnesium, zinc, lead, nickel, copper, iron, and other metal foams with sheets of steel, nickel, chromium, manganese, titanium, zirconium, and similar metals.

From the description above, it can be seen this invention comprises a process of contacting one or more surfaces with molten brazing substance, joining two articles so that the molten substance is between surfaces to be bonded and allowing the molten material to solidify, thereby forming a composite article. The molten brazing substance is contacted with the surface or surfaces under ambient atmosphere, modified or artificial atmosphere or a vacuum. Thus, the molten substance is contacted with the surface by means other than submerging the articles in molten brazing metal. Thus, the molten substance is contacted by a non-immersive method. In other words, this invention comprises applying brazing substance to an article rather than immersing the article in a molten metal.

Brazed articles of manufacture provided by this invention can be utilized wherever such a composite structural material is useful. For example, panels of aluminum sheet-aluminum foam-aluminum sheet can be used in manufacture of interior and exterior curtain walls, and floors, ceilings, and walls of trailers and other vehicle and container bodies. Panels made from steel sheet-aluminum foam-aluminum sheet have similar uses.

What is claimed is:

1. As an article of manufacture, a foamed aluminum substrate having a surface bonded to a metal body, said foamed aluminum substrate surface being pitted by cavities derived from metal foam pores of an average size of from about ⅓ to about ⅛ of an inch, the foamed aluminum substrate and metal body being bonded together by a bonding layer of metallic brazing substance, said article being prepared by a process which comprises rubbing a rod of said metallic brazing substance onto said foamed aluminum surface while said surface has molten metallic brazing substance thereon, thereafter applying said aluminum metal body to molten metallic brazing substance on said foam surface, and subsequently cooling the resultant structure below the solidification temperature of said brazing substance.

References Cited

UNITED STATES PATENTS

| | | | |
|---|---|---|---|
| 2,447,980 | 8/1948 | Hensel | 75—20 F |
| 2,751,289 | 6/1956 | Elliott | 75—20 F |
| 2,752,265 | 6/1956 | Whitfield | 29—196.2 |
| 2,979,362 | 4/1961 | Fiedler | 75—20 F |
| 2,985,411 | 5/1961 | Madden | 29—183 |
| 2,602,413 | 7/1952 | Miller | 29—197.5 |
| 2,424,557 | 7/1947 | De Bra | 29—191.2 |
| 2,752,265 | 6/1956 | Whitfield | 29—197 |
| 3,180,022 | 4/1965 | Briggs | 29—197 |
| 3,321,828 | 5/1967 | Miller | 29—197 |
| 3,549,423 | 12/1970 | Grubb | 29—183 |

HYLAND BIZOT, Primary Examiner

U.S. Cl. X.R.

29—197.5; 75—20